Patented Nov. 29, 1949

2,489,674

UNITED STATES PATENT OFFICE 2,489,674

VINYL RESIN PLASTICIZERS

Ernst P. Rittershausen, Hempstead, N. Y., assignor to Socony-Vacuum Oil Company, Incorporated, a corporation of New York No Drawing. Application August 5, 1948, Serial No. 42,753

13 Claims. (Cl. 260—30.2)

This invention has to do with vinyl resin compositions and, more particularly, has to do with thiophene polymer plasticizers in combination with vinyl resins.

As is well known in the art, materials identified as "plasticizers" have long been added to resins—natural and synthetic—to soften, increase toughness, or otherwise modify the properties thereof. Well known plasticizers are tricresyl phosphate, camphor and heavy oils. With the particular class of synthetic resins identified as "vinyl resins" tricresyl phosphate, dioctyl phthalate, dibutyl sebacate and certain aromatic petroleum oils have proven of value. These plasticizers have been advantageous in many respects and, yet, have been characterized by one or more disadvantages. For example, the esters such as dioctyl phthalate are relatively expensive and, in addition, have been available only in limited quantities. One salient shortcoming, however, is the relatively low resistance to gasolines and motor oils of the vinyl compositions containing such plasticizers.

It has now been discovered that the foregoing shortcomings of vinyl resin-plasticizer compositions can be overcome by incorporating with a vinyl resin a plasticizer comprising a thiophene polymer of the character defined below. Not only are the thiophene polymers of value when present as the sole plasticizer with a vinyl resin, but they are particularly valuable when in combination with plasticizers previously used with vinyls.

Thiophene polymers

The thiophene polymers effective for vinyl resin compositions are those having a molecular weight from about 200 to about 500. They are obtained by polymerizing thiophene or alkyl-substituted thiophenes in the presence of various catalysts, such as silica-alumina catalysts and orthophosphoric acid. As described at length in copending application Serial No. 745,725 of G. C. Johnson, thiophene and alkyl-substituted thiophenes polymerize in the presence of solid silica-alumina catalysts at temperatures ranging from about 20° C. to about 200° C., in a period of time ranging from about 1 hour to about 20 days, depending upon the reactant and the catalyst used. Such polymerization will result in the production of an oil, resin or crystalline solid. The use of approximately 100 per cent orthophosphoric acid as a catalyst for the preparation of the thiophene polymers is described in copending application Serial No. 38,954 of Howard D. Hartough and Seymour L. Meisel. While the aforesaid thiophene polymers and mixtures containing the same prepared with the silica-alumina catalysts and orthophosphoric acid represent particularly desirable plasticizers herein, it will be understood that all thiophene polymers having a molecular weight from about 200 to about 500 are suitable.

The thiophene polymers may be prepared from thiophene itself, or from any of its monoalkyl derivatives. 2-methyl thiophene, 3-methyl thiophene, 2-isopropyl thiophene, 2-t-butyl thiophene, 2-t-amyl thiophene, 2-s-butyl thiophene, 2-s-hexadecyl thiophene and the mixed alkyl thiophenes derived from the olefins of cracked wax or from other sources may be mentioned by way of non-limiting examples. The starting material may be either a single one of these compounds or a mixture of two or more thereof.

As indicated above, catalysts which may be used to polymerize thiophene and its derivatives to the thiophene polymers useful as plasticizers, include silica-alumina compositions. Typical silica-alumina catalysts used for the cracking of petroleum oils are considered suitable. For example, natural silica-alumina compositions may be used, such as "Super Filtrol" which is a trade name for an acid-treated, natural montmorillonite clay. Synthetic silica-alumina catalysts are also useful, typical of which are "beads" which are formed from a true hydrogel. The "beads" contain approximately 90–99% $SiO_2$ and 1–10% $Al_2O_3$.

By way of illustration, the reaction with a silica-alumina catalyst may be accomplished either batchwise or continuously. One batch method consists in stirring the reactant and catalyst at a fixed temperature for the required period of time. The liquid is then filtered from the catalyst and distilled. The desired product either remains as a residue or is distilled over at reduced pressure as a high boiling distillate.

A solvent, such as benzene, may be added before filtering to remove the catalyst, or the catalyst, after filtration, may be washed with benzene or other solvents to remove as much as possible of the product. Relatively large quantities of catalyst, about ½ part by weight to each part by weight of reactant may be used. Such a mixture is easily stirred and gives a relatively large yield of product.

A second batch method utilizes even larger amounts of catalyst, about 1 part by weight of catalyst to 1 part by weight of reactant. The liquid and solid are mixed and merely allowed to stand in the reactor at a fixed temperature for a fixed length of time, or mixed, not by a stirrer, but by an apparatus resembling a cement mixer or tumbler. The consistency of the reaction mixture resembles mud or plaster rather than a liquid containing suspended solids, as in the case of the first batch method of operation. In the second method of operation it is essential that a solvent, such as benzene, be used in order to recover a high yield of product.

A continuous overflow method of operation consists in moving the reactant in a closed cycle into contact with or through the catalyst. Additional reactant may be continuously added to the cycle at one point and a corresponding volume of product and unreacted material continuously removed at another point. The remaining materials may be distilled to recover the polymerized product. The unreacted material from this distillation may also be returned to the mixing cycle.

The reaction may also be accomplished continuously by percolation, that is, by passing the reactant through a bed of catalyst at a rate of flow and at a temperature adjusted to give a high yield of product. Unreacted material may be recycled to obtain maximum conversion. A minor evolution of hydrogen sulphide gas occurs, but there is very little indication of the occurrence of any important side reactions.

Typical, and non-limiting, examples of thiophene polymers effective for vinyl resins are described in Examples I and II below:

Example I

One hundred and fifteen (115) grams of commercial 4–6 mesh "Sovabeads" were placed in the thimble of a Soxhlet extractor and 800 grams of thiophene were refluxed through the thimble, in the usual method used with Soxhlet extractors. [The "Sovabeads" comprise approximately two percent alumina ($Al_2O_3$) and the remainder silica ($SiO_2$), and are formed as described in Patent No. 2,384,946, issued September 18, 1946, to M. Marisic.] Refluxing of thiophene was continued for 85 hours, the temperature rising from 84° C., boiling point of thiophene, to 102° C. Seven hundred and twenty-four (724) grams of liquid product was recovered; most of the 76 grams not accounted for was adsorbed or mechanically held on the "Sovabeads." The entire liquid product was distilled, whereby 272 grams of thiophene were recovered. Distillation of the thiophene-free product was continued under vacuum, with the distillation results as shown in the following tabulation:

| Fraction | Pressure, mm. | Pot. Temp. °C. | Take-off Temp. °C. | Weight | $n_D^{20}$ |
|---|---|---|---|---|---|
| 1 | 7 | 210 | 105 | 15 | 1.6031 |
| 2 | 14 | 217 | 203 | 22 | 1.6139 |
| 3 | 14 | 224 | 204 | 160 | |
| 4 | 6 | 260 | 196 | 124 | |
| Res | | | | 84 | |

The distillation loss was 47 grams. For comparative purposes calculations were made for the distilling range at 10 mm. pressure. Fraction 3 distilled at 196–197° C. and fraction 4 at 197–203° C. at 10 mm. These fractions were taken as "thiophene trimer." In general, a somewhat broader cut, 185°–215° C. at 10 mm. is taken as the boiling range of thiophene trimer. Fraction 3 was analyzed and found to contain 36.1% sulfur, 4.7% hydrogen and 57.8% carbon. Thiophene or its polymers are calculated to contain 38.1% sulfur, 4.8% hydrogen and 57.1% carbon. These analyses are sufficiently close to indicate that the product consists essentially of thiophene polymer. The determined molecular weight of fraction 3 was 192. The calculated value for thiophene dimer is 168 and for trimer 252. The uncertainty in the molecular weight determinations are so large that it was considered that the results were not inconsistent with the view that fraction 3 was a trimer.

Fractions 3 and 4, taken as "thiophene trimer," comprise 284 grams. These fractions were combined and are identified hereinafter as polymer A.

The residue, 84 grams, is predominantly a pentamer of thiophene and is identified below as product B.

Example II

Five hundred and fifty (550) grams of 4–6 mesh commercial "Sovabeads" (identified in Example I) were placed in the thimble of a Soxhlet extractor and 1135 grams of thiophene were refluxed thereover at 85–95° C. for 24.5 hours. The recovered liquid weighed 860 grams; "Sovabeads," wet with thiophene and polymers thereof, weighed 800 grams. Twenty-five grams were unaccounted for. Most of the unreacted thiophene was removed from the liquid product by distilling the same to 135° C. at atmospheric pressure. The residue, 360 grams, was further distilled at reduced pressure. The distillation results are shown in the following tabulation:

| Fraction | Pressure | Pot. Temp. °C. | Take-off Temp. °C. | Weight | $n_D^{20}$ |
|---|---|---|---|---|---|
| 1 | 5 | 205 | 120 | ¹83 | |
| 2 | 5 | 215 | 139 | 2 | 1.6276 |
| 3 | 5 | 214 | 170 | 3 | 1.6333 |
| 4 | 5 | 214 | 190 | 27 | 1.6428 |
| 5 | 5 | 223 | 192 | 40 | 1.6452 |
| 6 | .5 | 235 | ²180 | 25 | |
| Residue | | | | 180 | |

¹ Recovered thiophene.
² Not enough distilling to keep temperature up.

Fractions 5 and 6 boil in the range of 199°–201° C. at 10 mms. Hg pressure (calculated) and are predominantly thiophene trimer. These fractions were combined (372 grams) and identified also as polymer A.

The residue, 180 grams, has a molecular weight of 488. Thiophene pentamer has a calculated molecular weight of 420 and the hexamer has a calculated molecular weight of 504. The uncertainties of the molecular weight determination are such that the observed value was considered consistent with the view that the residue was composed mainly of the pentamer. The residue, therefore, is also identified as polymer B.

Vinyl resins

Vinyl resins are well known in the art and are described at length in Part III of "Synthetic Resins and Rubbers," Paul A. Powers, 1943. Typical of vinyl, and modified vinyl, resins or polymers with which the thiophene polymers may be used are the vinyl: acetate, chloracetate, alcohol, alcohol acetal, ethers, ketones, bromide, chloride, vinylidene chloride, acrylates and methacrylates, benzene (styrene); and mixtures thereof such as vinyl chloride-vinyl acetate and vinyl chloride-vinylidene chloride.

Particularly advantageous compositions have been formed with copolymers of vinyl chloride and vinyl acetate containing from 90–98% vinyl chloride and 2–10% vinyl acetate, with an intrinsic viscosity range of 0.55 to 1.55 for a 0.4% solution of the resins in cyclohexanone; and with a polyvinyl chloride having a viscosity of approximately 0.55 for a 0.4% solution in nitrobenzene.

The term "intrinsic viscosity" used herein is defined at pages 47 to 49 of the aforesaid text "Synthetic Resins and Rubbers."

It will be understood that the vinyl resins used in the compositions of this invention in association with the foregoing thiophene polymers, may vary considerably in molecular weight and in physical characteristics. In general, however, most satisfactory results are obtained with those having a viscosity range, which is an indication of molecular weight, from about 0.55 to 1.55.

*Compounding of vinyl resin and plasticizer*

Quantities of vinyl resin, thiophene polymer plasticizer (alone or with another plasticizer) and a stabilizer, described below, are combined in a suitable vessel and thoroughly mixed, in the conventional manner. It is desirable to have the resin completely wetted by the plasticizer. The mixture thus obtained is milled, for example, on a standard 12 x 6 laboratory rubber mill, with the rolls thereof maintained at approximately 290° F. The resin-plasticizer mixture fluxes at about 290° F., forming a continuous band of vinyl sheet around one roll. The clearance between the two rolls is set at such a distance that the excess resin mix forms a "bank" between the two rolls. In this manner, the batch is well mixed. After complete mixing, the batch is cut from the roll in the form of a thin sheet.

For test purposes, sufficient plies or layers of the vinyl sheet are placed in a standard A. S. T. M. 6" x 6" x 0.32" mold, and formed into sheets of these dimensions by heat and pressure. After cooling and removal of the molded sheet, standard A. S. T. M. "dumbbells" and other necessary test strips are stamped out in a die.

With regard to the proportions of vinyl resin and thiophene polymer, it has been found these materials are compatible over a wide range. While the proportions may be varied widely, however, it has further been discovered that optimum proportions for thiophene polymers of molecular weight from about 190 to about 250, as illustrated by thiophene trimer and polymer fractions predominating in trimer, are of the order of 70 parts by weight per hundred parts of vinyl resin having a viscosity range from about 0.55 to 1.55. Correspondingly, with thiophene polymers characterized by molecular weights between about 400 and about 490, typified by the pentamer and compositions predominantly pentamer, optimum proportions are in the neighborhood of 70 parts by weight per hundred parts of vinyl resin having a viscosity range of about 0.55 to 1.55. For example, the pentamer solid at 20-25° C., is suitable for applications where high boiling vinyl plasticizers are desirable. It will be understood, therefore, that advantageous proportions of thiophene polymer and vinyl resin will vary considerably depending upon the molecular weights thereof.

As indicated above, the thiophene polymer plasticizers have proven of outstanding value when used with plasticizers hitherto and presently used with vinyl resins. Typical plasticizers with which the thiophene polymers may be associated are tricresyl phosphate, dioctyl phthalate, dibutyl sebacate and aromatic petroleum oils. Excellent results have been obtained by using from about 15 to about 50 parts by weight of thiophene polymer, with from about 15 to about 40 parts by weight of a conventional vinyl plasticizer, per 100 parts of vinyl resin.

Previously mentioned in connection with compounding of a vinyl resin and a plasticizer was the use of a stabilizer. The latter is generally used with vinyl resin compositions in small proportions, of the order of 1 to 5 per cent by weight of vinyl resin. Stabilizers which may be used to advantage with the compositions of this invention include dibasic lead stearate, basic lead carbonate, tin soaps, alkaline earth metal soaps, metallic oxides, and aromatic amines.

To demonstrate the character of the vinyl resin compositions plasticized with the foregoing thiophene polymers, various test samples were subjected to standard A. S. T. M. test methods. For the determination of plasticity efficiency, modulus at 200% tensile strength and per cent elongation, a standard A. S. T. M. type B specimen dumbbell was used. The tests were made on a Scott tensile tester under the conditions prescribed by A. S. T. M. method D412-41.

Plasticity efficiency is a measure of the degree of softening obtained by the plasticizer under test when used at a given concentration. It is determined by measuring the stress needed to elongate a sample specimen twice its original length or 100%.

Modulus at 200% is the stress required to elongate the standard test specimen 200% of its original length.

Flexure strength is determined on a Tinius Olsen flexure strength apparatus, in which the force required to bend a test specimen through a 90 degree angle is measured.

In the extraction loss tests, test strips approximately 5 x 6 inches are cut from the plasticized vinyl film having an 0.010 inch thickness. Each strip is weighed before it is placed on a 16 oz. wide-mouth screw cap jar and submerged in the extraction liquid. The water used was distilled. 100 octane aviation gasoline was employed and an oil having the following general characteristics was used for the oil extraction tests.

| | |
|---|---|
| A. P. I. gravity | 39.0 |
| Visc. @ 100° F. S. U. S | =40 |
| Flash, C. O. C °F | 280 |
| Aniline pt °F | 168 |

These jars were stored at 70° F. for 240 hours, after which time, the vinyl films were removed. In the case of the oil, the sample was washed with petroleum ether before drying. All samples were dried for 3 hours at 60° C. before final weighing. Percentage change in weight is calculated from original and final weighings.

In the tabulation of test results shown below in the table, the following symbols are used to identify the individual vinyl resins, thiophene polymers, and conventional plasticizers (in each composition under test, 1% by weight of dibasic lead stearate was present as a stabilizer.

Plasticizer A: Polymer A above, thiophene trimer fraction, molecular weight 182.
Plasticizer B: Polymer B above, thiophene pentamer fraction, molecular weight 488.
Plasticizer C: Polymers A and B above, thiophene trimer and pentamer fractions, combined; average molecular weight about 400.
Plasticizer D: Dioctyl phthalate.
Vinyl E: Vinyl chloride-vinyl acetate copolymer, containing 90-98% vinyl chloride and 2-10% vinyl acetate, with an intrinsic viscosity range of about 0.55 to 1.55.
Vinyl F: Polyvinyl chloride, with an intrinsic viscosity range of about 0.55 to 1.55.

Table

| Plasticizer | A | A | A | A | A | A | C | C | C | A+D | A+D |
|---|---|---|---|---|---|---|---|---|---|---|---|
| Parts by Weight | 35 | 40 | 45 | 35 | 40 | 45 | 35 | 40 | 45 | 20; 20 | 30; 10 |
| Vinyl | E | E | E | F | F | F | E | E | E | E | E |
| Parts by Weight | 65 | 60 | 55 | 65 | 60 | 55 | 65 | 60 | 55 | 60 | 60 |
| Plasticity Efficiency @ 100% | 2,040 | 1,430 | 960 | 2,820 | 1,560 | 1,300 | | | | 970 | 1,460 |
| Modulus @ 200% | | 1,750 | | | | | | | | | |
| Elongation, Per Cent | 210 | 280 | 310 | 180 | 250 | 310 | | | | 310 | 280 |
| Tensile Strength, p. s. i | 3,130 | 3,260 | 2,640 | 5,100 | 3,140 | 2,820 | 7,810 | 6,100 | 4,400 | 2,730 | 2,780 |
| Flexure Strength, p. s. i | | | 382 | | | | | | | | |
| Brittleness Temperature, °C | −40 | −30 | −40 | −30 | −30 | −30 | Failed at 0 | 0 | 0 | −50 | −40 |
| Extraction Loss: | | | | | | | | | | | |
| Water | 0.69 | 0.95 | 0.58 | 0.29 | 0.97 | 0.77 | +0.32 | 0.06 | 0.28 | 0.57 | 0.47 |
| Mineral Oil | 2.58 | 5.72 | 12.43 | 1.45 | 4.73 | 29.06 | 0.04 | +0.22 | +0.15 | 23.82 | 4.79 |
| Gasoline (100 octane) | 9.59 | 15.57 | 24.96 | 3.10 | 13.77 | 10.58 | 0.48 | 0.52 | 0.54 | 11.91 | 18.48 |

| Plasticizer | B+D | B+D | B+D | B+D | C+D | C+D | C+D | B+D | B+D | B+D | B+D | B+D |
|---|---|---|---|---|---|---|---|---|---|---|---|---|
| Parts by Weight | 12; 24 | 30; 10 | 20; 20 | 10; 30 | 30; 10 | 20; 20 | 10; 30 | 12; 24 | 20; 20 | 10; 30 | 20; 20 | 30; 10 |
| Vinyl | E | E | E | E | E | E | E | F | F | F | F | F |
| Parts by Weight | 65 | 60 | 60 | 60 | 60 | 60 | 60 | 65 | 60 | 60 | 60 | 60 |
| Plasticity Efficiency @ 100% | 2,790 | | 2,400 | 1,410 | 2,510 | 1,970 | 1,280 | 2,540 | 2,900 | 1,750 | 2,900 | |
| Modulus @ 200% | | | | | | | | | | | | |
| Elongation, Per Cent | 240 | 10 | 230 | 300 | 260 | 270 | 300 | 280 | 280 | 300 | 280 | |
| Tensile Strength, p. s. i | 3,540 | 7,310 | 3,380 | 3,060 | 3,470 | 3,340 | 2,760 | 3,460 | 3,710 | 2,980 | 3,710 | 7,800 |
| Flexure Strength, p. s. i | | | | | | | | | | | | |
| Brittleness Temperature, °C | −20 | Failed at 0 | −20 | −70 | 0 | −20 | −50 | −50 | −10 | −50 | −10 | Failed at 0 |
| Extraction Loss: | | | | | | | | | | | | |
| Water | −0.14 | +0.11 | +0.15 | +0.65 | 0.38 | 0.75 | +0.21 | +0.42 | +0.06 | +0.82 | +0.06 | +0.17 |
| Mineral Oil | 0.02 | +0.55 | +0.75 | 1.13 | 0.72 | 2.07 | 8.28 | +0.59 | +0.26 | 20.97 | +0.26 | +0.32 |
| Gasoline (100 octane) | 9.57 | +0.33 | 9.26 | 16.65 | 4.04 | 15.86 | 20.85 | 9.29 | 8.00 | 2.23 | 8.00 | +0.02 |

From the test results set forth above in the table, it will be noted that compositions containing thiophene polymers as plasticizers have excellent resistance to hydrocarbons, specifically oil and/or gasoline. In the same connection, those compositions which contain dioctyl phthalate and a thiophene polymer, as a plasticizer combination, have excellent resistance to mineral oil and/or gasoline when the thiophene polymer represents more than about 25 per cent of the plasticizer combination. That is, when the ratio of thiophene or dioctyl phthalate is 3 : 1 or 1 : 1, the resistance of the vinyl resin composition containing the two plasticizers is generally much greater than when the ratio is 1 : 3.

The results obtained from our experiments indicate that the trimer fraction of thiophene is a suitable sole plasticizer for either the copolymer of vinyl chloride and vinyl acetate, or for polyvinyl chloride, and may be used as such. In certain cases it is desirable, however, to combine an ester plasticizer with the trimer fraction of thiophene to obtain balanced properties of the product. For instance, in many applications, it is advantageous to be able to include relatively large amounts of plasticizer, and yet not obtain excessive softening of the finished vinyl product. The trimer fraction of thiophene may be used in combination with an ester plasticizer to insure large amounts of liquid plasticizer in the mixture and yet obtain the desired properties.

The pentamer fraction of thiophene, being a high boiling material, may be readily adapted to such applications where low volatility is of utmost importance, such as in the wire-coating field. The data obtained, using the pentamer as partial replacement for an ester plasticizer indicate that the physical properties are similar to those required of vinyl wire coatings.

It is apparent from the foregoing, therefore, that the vinyl resin compositions of this invention possess excellent resistance to attack by hydrocarbons. They also form excellent molded articles. The compositions, whether in the form of films or molded articles, may be cured by heat as shown above.

It will be understood that the foregoing typical examples serve to illustrate the invention and not to limit the same, rather, the invention is to be broadly construed in the light of the language of the appended claims.

I claim:

1. A composition of matter comprising a vinyl resin and a thiophene polymer having a molecular weight from about 200 to about 500.

2. A composition of matter comprising a vinyl resin and a monoalkyl thiophene polymer having a molecular weight from about 200 to about 500.

3. A composition of matter comprising a vinyl resin and a thiophene trimer.

4. A composition of matter comprising a vinyl resin and a thiophene pentamer.

5. A composition of matter comprising 100 parts by weight of a vinyl resin and from about 40 to about 80 parts by weight of a thiophene polymer having a molecular weight from about 200 to about 500.

6. A composition of matter comprising a vinyl acetate-vinyl chloride copolymer, and a thiophene polymer having a molecular weight from about 200 to about 500.

7. A composition of matter comprising a vinyl resin composition containing dioctyl phthalate, and being characterized by relatively low resistance to organic hydrocarbons including mineral oils and gasolines, having in admixture therewith a quantity, effective to increase resistance against said organic hydrocarbons, of a thiophene polymer having a molecular weight from about 200 to about 500.

8. A composition of matter comprising a vinyl resin composition containing 100 parts by weight of a vinyl resin comprising a vinyl chloride-vinyl acetate copolymer, between about 15 and about 40 parts by weight of dioctyl phthalate, and between about 15 and about 50 parts by weight of thiophene trimer.

9. A composition of matter comprising a vinyl resin composition containing 100 parts by weight of a vinyl resin comprising a vinyl chloride-vinyl acetate copolymer, between about 15 and about 40 parts by weight of dioctyl phthalate, and between about 15 and about 50 parts by weight of thiophene pentamer.

10. A composition of matter comprising a vinyl resin composition containing 100 parts by weight of a vinyl resin comprising a vinyl chloride-vinyl acetate copolymer, between about 15 and about 40 parts by weight of dioctyl phthalate, and between about 15 and about 50 parts by weight of a thiophene polymer predominantly comprised of thiophene trimer and pentamer.

11. A composition of matter comprising a vinyl resin composition containing a plasticizer for the vinyl resin, and being characterized by relatively low resistance to organic hydrocarbons including mineral oils and gasolines, and having incorporated therewith a quantity, effective to increase resistance against said organic hydrocarbons, of a thiophene polymer having a molecular weight from about 200 to about 500.

12. A composition of matter comprising a vinyl resin composition containing an ester plasticizer for the vinyl resin, and being characterized by relatively low resistance to organic hydrocarbons including mineral oils and gasolines, and having incorporated therewith a quantity, effective to increase resistance against said organic hydrocarbons, of a thiophene polymer having a molecular weight from about 200 to about 500.

13. A composition of matter comprising a vinyl resin composition containing 100 parts by weight of a vinyl resin, between about 15 and about 40 parts by weight of a plasticizer for the vinyl resin, and between about 15 and about 50 parts by weight of a thiophene polymer having a molecular weight from about 200 to about 500.

ERNST P. RITTERSHAUSEN.

No references cited.